(12) United States Patent
Ma

(10) Patent No.: US 9,227,270 B2
(45) Date of Patent: Jan. 5, 2016

(54) METHOD TO MONITOR THE LIFE OF THE CONTACT TIP IN GMAW-PULSE

(71) Applicant: Tiejun Ma, Tecumseh (CA)

(72) Inventor: Tiejun Ma, Tecumseh (CA)

(73) Assignee: Illinois Tool Works Inc., Glenview, IL (US)

( * ) Notice: Subject to any disclaimer, the term of this patent is extended or adjusted under 35 U.S.C. 154(b) by 186 days.

(21) Appl. No.: 13/690,061

(22) Filed: Nov. 30, 2012

(65) Prior Publication Data

US 2014/0151349 A1    Jun. 5, 2014

(51) Int. Cl.
| | |
|---|---|
| B23K 9/095 | (2006.01) |
| B23K 31/00 | (2006.01) |
| B23K 9/09 | (2006.01) |
| B23K 9/12 | (2006.01) |
| B23K 9/133 | (2006.01) |

(52) U.S. Cl.
CPC . *B23K 31/00* (2013.01); *B23K 9/09* (2013.01); *B23K 9/0956* (2013.01); *B23K 9/123* (2013.01); *B23K 9/1336* (2013.01)

(58) Field of Classification Search
CPC ............ B23K 9/095; B23K 9/10; B23K 9/12; B23K 9/127; B23K 9/26; B23K 9/32; B23K 26/1494
USPC .................. 219/137 R, 130.1, 137.2, 130.21, 219/130.31, 130.32, 130.33
See application file for complete search history.

(56) References Cited

U.S. PATENT DOCUMENTS

| | | | |
|---|---|---|---|
| 4,504,728 A | 3/1985 | Ukai et al. | |
| 4,973,813 A | 11/1990 | Mitchell | |
| 5,221,825 A | 6/1993 | Siewert et al. | |
| 5,486,679 A | 1/1996 | Hamura et al. | |
| 5,812,408 A | 9/1998 | Karakama et al. | |
| 6,639,181 B2 * | 10/2003 | Suzuki et al. | 219/130.01 |
| 6,710,300 B2 | 3/2004 | Steenis et al. | |

(Continued)

FOREIGN PATENT DOCUMENTS

| | | |
|---|---|---|
| DE | 259162 | 8/1988 |
| EP | 1283088 | 2/2003 |

(Continued)

OTHER PUBLICATIONS

Holm, R., "Electrical contacts, Theory and applications," pp. 40, 41, 86, 87, 160, 161, 274, 275, 304, 305, 4th ed., Springer, 2000.

(Continued)

*Primary Examiner* — Brian Jennison
(74) *Attorney, Agent, or Firm* — Fildes & Outland, P.C.

(57) ABSTRACT

A method of monitoring and assessing contact tip useful life in a GMAW-pulse application. The pulse welding waveform includes current and voltage that periodically change between peaks and background. The welding current and voltage are measured on a series of repeated representative welds. The data that corresponds to the arc start and the arc stop of a weld is removed. The data is averaged for each representative weld, which corresponds to production of welded parts and/or usage of the contact tip. The deterioration of the contact tip is assessed based on one or more of (i) a decrease in the frequency of the peaks, (ii) an increase in the length of the background, and (iii) an increase in the occurrence of abnormal low voltage. The assessment is outputted as contact tip life data, and continuously fed to a controller or operator.

7 Claims, 5 Drawing Sheets

(56) References Cited

U.S. PATENT DOCUMENTS

| | | |
|---|---|---|
| 6,943,318 B2 | 9/2005 | Takagi et al. |
| 2008/0035623 A1 | 2/2008 | Hutchison |
| 2008/0149608 A1* | 6/2008 | Albrecht .................... 219/130.1 |
| 2008/0314876 A1 | 12/2008 | Pinsonneault et al. |
| 2011/0073580 A1* | 3/2011 | Ma et al. .................... 219/137 R |
| 2012/0234812 A1 | 9/2012 | Ma et al. |

FOREIGN PATENT DOCUMENTS

| | | |
|---|---|---|
| JP | 8318372 | 12/1996 |
| JP | 2000024779 | 1/2000 |
| WO | 2009/031704 | 3/2009 |

OTHER PUBLICATIONS

Thier, H. et al., "Current contact tip life—Evaluation for different contact tip materials and shapes," Welding and Cutting, pp. 22-27, vol. 46, No. 5, 1995.

Shimizu, H. et al, "Wear mechanism in contact tube," Science and Technology of Welding and Joining, pp. 94-105, vol. 11, No. 1, 2006.

International Search Report in corresponding PCT application No. PCT/US2013/066915.

* cited by examiner

METHOD TO MONITOR THE LIFE OF THE CONTACT TIP IN GMAW-PULSE

TECHNICAL FIELD

This invention relates to contact tips for a welding torch, and more particularly to a method of monitoring and assessing performance of a contact tip in GMAW-pulse (gas metal arc welding) applications using non-constant voltage pulse waveforms.

BACKGROUND OF THE INVENTION

It is known in the art relating to robotic and automatic GMAW manufacturing applications that the welding torch contact tip, being a consumable item, is usually replaced between shifts, during maintenance, or when an operator observes unacceptable welding defects on manufacturing workpieces. If the contact tip needs to be replaced during a shift, the entire welding line or cell must be shut down, which results in manufacturing delays and increased costs for the plant.

Judging when to replace a contact tip is a subjective process. Certain operators may pass (accept) some workpieces having welding defects, while other operators may have less tolerance for defects, thereby consuming more contact tips and causing more shutdowns over time. Also, usually when an operator determines that a contact tip needs to be replaced, welding defects have begun to occur, thus meaning that some workpieces may have to be repaired or scraped for quality reasons.

Historically, there have been two major contact tip failure mechanisms that have been observed over the past 50 years in constant voltage (CV) welding applications. The first is excessive wear at the front of the bore in the contact tip, which is known as a "keyhole." The second failure mechanism is a sudden stoppage of the feeding of electrode welding wire due to a clog, jam, or excessive feeding force inside the contact tip, causing the welding arc to burn back to the contact tip, which is known as "burn back."

The application of new GMAW welding processes, especially pulse welding, over the past decade has introduced a new contact tip failure mechanism. The high frequency and high peak current of pulse welding make the working conditions of the contact tip more critical than in CV welding. For example, it is common for a 0.9 mm (0.035 inch) solid electrode wire to be welded at 400 Amp peak current in a pulse welding application, while in constant voltage applications the typical welding current is only about 170 to 220 Amps. As the current doubles, the energy or power transferred across the contact tip to electrode wire interface quadruples. Also, in pulse welding, the welding current changes from the background current (100 Amps) to the peak current (400 Amps) in 0.15 to 0.30 ms, which corresponds to a rate of 1 to 2 million Amps per second. The high welding current and drastic current ramp causes significant arc erosion on the contact tip, thus deteriorating the contact tip. Pulse welding applications are typically set at high welding speeds, and therefore require accurate delivery of the welding current waveforms to the arc. Thus, consistent performance of the contact tip is more critical than in CV applications. The useful lifespan of a contact tip in pulse applications is significantly shorter than in CV applications. It is more likely that a contact tip will have to be replaced during a shift, and knowing when to replace the contact tip is important for preventing welding defects and minimizing operating costs.

Conventional control systems in robotic and automatic welding applications compare the commanded (desired) welding current and voltage with actual measured data. When the difference between the commanded values and the measured data is higher than a certain predetermined threshold, the system will regard the welding as out of compliance and will request immediate action such as shutdown of the manufacturing line. However, a monitoring method does not exist that assesses the useful life of a contact tip in GMAW-pulse applications, in order to output an alarm or other signal prior to the occurrence of welding defects so that the contact tip may be changed prior to failure. Further, known monitoring methods fail to adequately take into account noise factors such as arc start, arc stop, and manufacturing errors such as the dimension variation of the parts. Thus, there is a need for monitoring and assessing contact tip deterioration in real time in GMAW-pulse applications so that contact tips may be replaced prior to the occurrence of welding defects or at least in a manageable manner such that welding defects and contact tip replacement are kept at a minimum.

In the prior art, Yukimitsu (U.S. Pat. No. 1,293,088) used the average current during the arcing period to indicate the wear of the contact tip. The method was based on short-circuit welding (also known as "short-arc" GMAW), which is one of the metal transfer modes in constant voltage (CV) welding. Kitagawa (JP 2000-24779) counted the periodic variations of the welding current to interpret the deterioration of the contact tip. These periodic variations were caused by the laps or cast of the electrode wire, and the periodic changes of the contacting force and position of the welding wire inside the contact tip. Both Yukimitsu and Kitagawa were based on constant voltage (CV) welding, and thus did not consider the new failure mechanism of the contact tip in pulse applications as well as the versatility of the pulse welding control.

SUMMARY OF THE INVENTION

The present invention provides a method for monitoring and assessing the useful life of a contact tip in robotic or automatic manufacturing processes that use GMAW-pulse applications. In non-CV applications such as GMAW-pulse, the welding current and voltage periodically vary between peak and background values at controlled frequency, ramp rates, etc., which collectively define a waveform. The present method utilizes a decrease in the frequency of the pulses, an increase in the length of the background, and/or an increase in the occurrence of abnormal low voltage that corresponds to the shortage of electrode being delivered to the welding pool, to assess the deterioration of the contact tip. The assessment of contact tip deterioration allows an operator to be proactive rather than reactive in replacing deteriorated contact tips.

More particularly, a method of monitoring and assessing contact tip useful life in a welding torch in accordance with the present invention includes applying a pulse welding waveform through the contact tip to operate the weld. The welding current and voltage are measured on a series of repeated welds. The obtained welding data is stored. The stored data that corresponds to the arc start and the arc stop is removed. The deterioration of the contact tip is assessed based on one or more of (i) a decrease in the frequency of the pulses, (ii) an increase in the length of the background, and (iii) an increase in the occurrence of abnormal low voltage. The assessment is outputted as contact tip life data.

The measurements may be taken on a series of repeated representative welds in a production environment. The representative weld may be greater than 3 seconds. The contact tip life data may be continuously fed to an operator or controller.

Optionally, when the contact tip life data reaches a threshold value, an alarm is sounded, a warning message is displayed, a contact tip change is scheduled, and/or an automatic contact tip change is triggered.

These and other features and advantages of the invention will be more fully understood from the following detailed description of the invention taken together with the accompanying drawings.

DETAILED DESCRIPTION OF THE INVENTION

Figure 1:
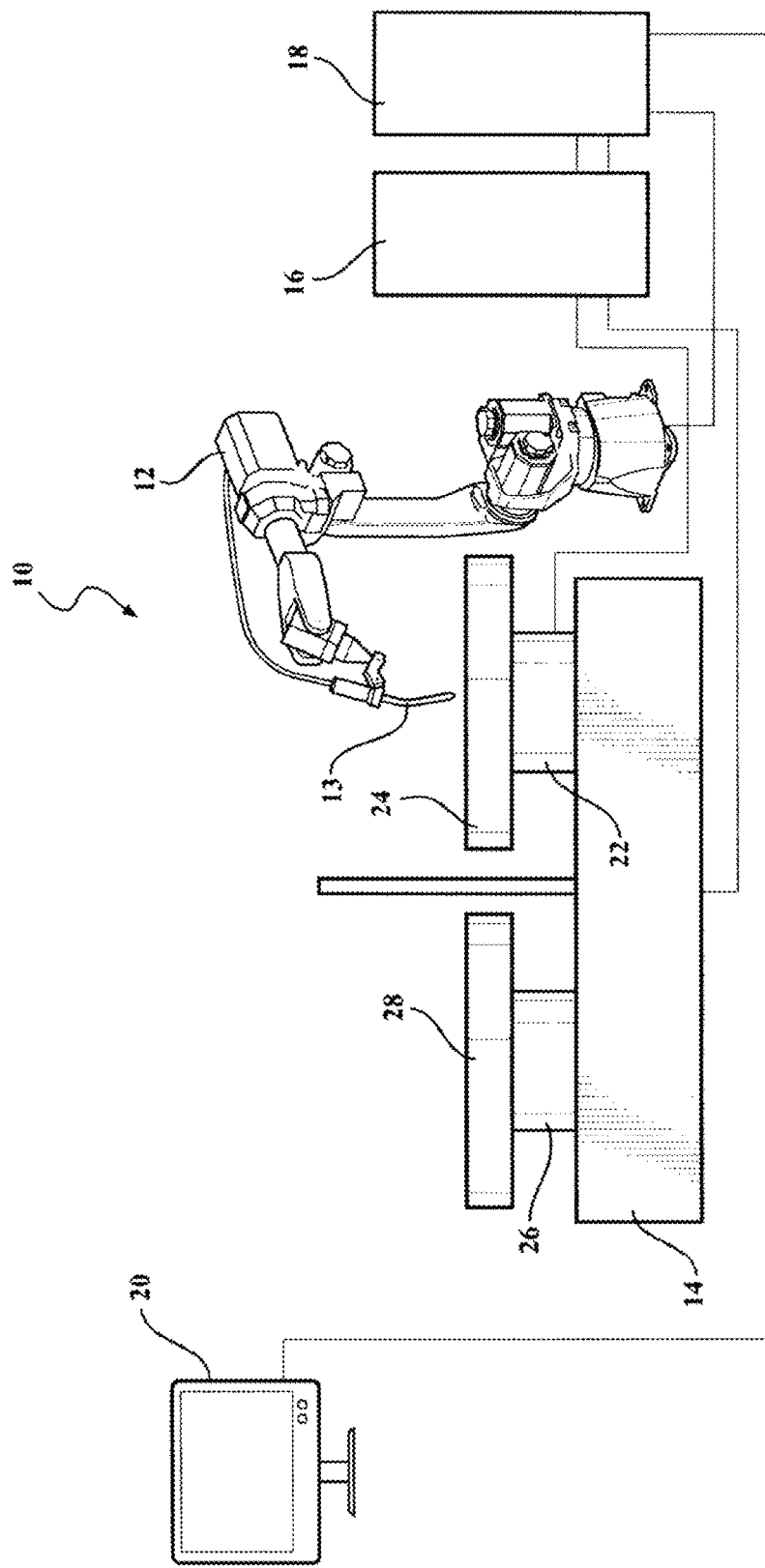
FIG. 1 is a schematic view of a robotic welding manufacturing cell.

Referring now to the drawings in detail, numeral 10 in FIG. 1 generally indicates a robotic welding manufacturing cell. The welding cell 10 generally includes a welding robot 12 including a welding torch 13, a turn table 14 disposed in a working relationship relative to the robot, a power source 16 connected to the robot, a robot controller 18 connected to the power source 16, the robot 12, and the turn table 14, and a manufacture line display and control (MLDC) 20. The turn table 14 may have two sides including an A-side 22 that holds a workpiece such as part 24 and a B-side 26 that holds a workpiece such as part 28. While part 24 is being welded by the robot 12, part 28 may be loaded/unloaded by a handling robot or a human operator.

The welding power source 16 and the robot controller 18 may be separate or may be integrated in one unit. In either case, the power source 16 and controller 18 provide proper welding energy and control the welding locations and sequences. The MLDC 20 monitors and controls the welding performed in the cell 10, which includes managing the welding programs of the robot, part movement, fixture engagement, and safety, and displaying information indicating the status of the cell. The MLDC 20 may also coordinate an entire manufacturing line having more than one welding cell.

Most of the power sources currently used in automatic welding manufacturing lines are digital power sources having integrated data recording systems that allow for real-time acquisition of welding parameters including welding current, welding voltage, wire feeding speed, and the like. In the present invention, welding current and voltage are acquired and processed by the power source 16, or the robot controller 18, or an independent device such as the MLDC 20, so that digital values can be calculated and then displayed on the MLDC.

The welding torch 13 is equipped with a contact tip through which consumable electrode wire is fed while the robot 12 welds workpieces. The contact tip itself is a consumable item and must be replaced periodically to maintain acceptable welding quality. Knowing when to replace the contact tip is important for preventing welding defects while also minimizing operating costs. The present invention provides a method for monitoring and assessing the useful life of the welding torch contact tip in the welding work cell 10.

Figure 2:
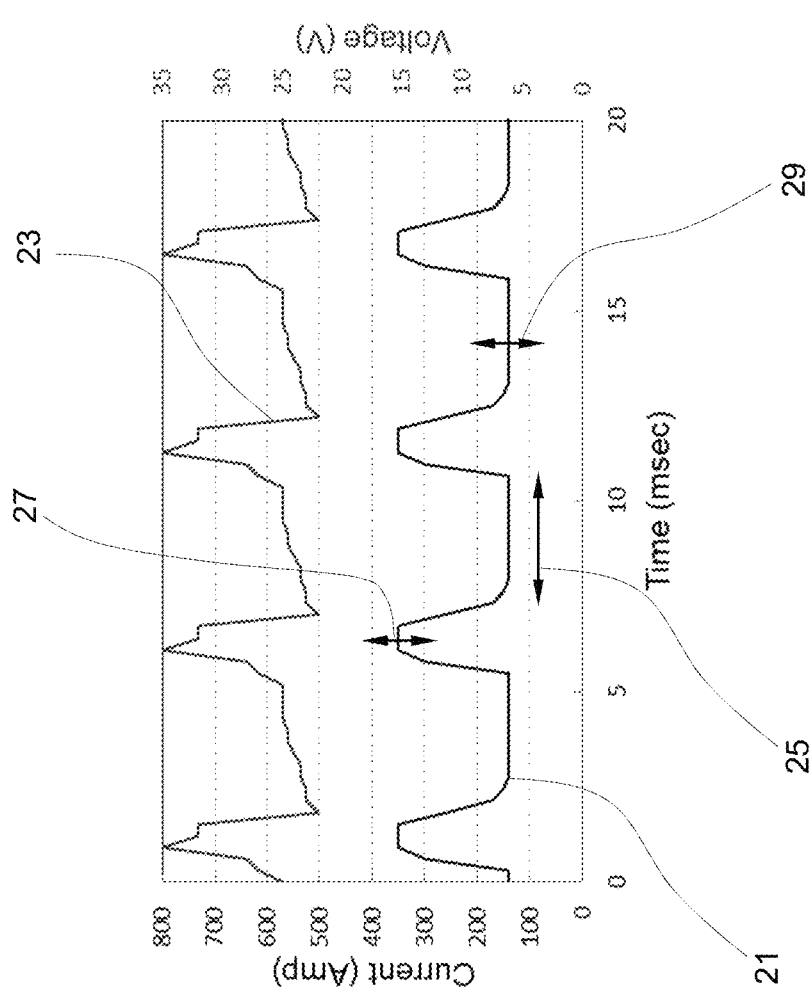
FIG. 2 is a schematic illustration of a pulse waveform and its adaptive mechanisms.

A pulse waveform is schematically shown in FIG. 2. It includes a series of current 21 and voltage 23, periodically changed between peaks (high values) and background (low values). Ideally, one pulse cycle provides enough energy to melt one droplet of electrode wire and transfer it to the liquid welding pool. Different welding wires (materials and dimensions) use different waveform parameters (peak value, background value, frequency, ramp speed, etc.). However, due to the dynamic of the electromagnetic field, the plasma arc, as well as the variation of the welding wire, parts, etc., the pulse waveform is dynamically adjusted by the power source to maintain a smooth arc. This adjusting mechanism, referred to as "adaptive," typically includes: (a) adjusting the length of the background 25; (b) adjusting the value of the peak 27; and (c) adjusting the value of the background 29. Option (a) is presently the most commonly used mechanism.

For example, when a contact tip is deteriorated, the electrical resistance of the welding loop (circuit) increases, and the pulse power source uses adaptive mechanism (a) to automatically increase the length of the background of the pulse waveform. Since the duration of the pulse peak remains unchanged, the pulse frequency is thereby reduced.

Figure 3:
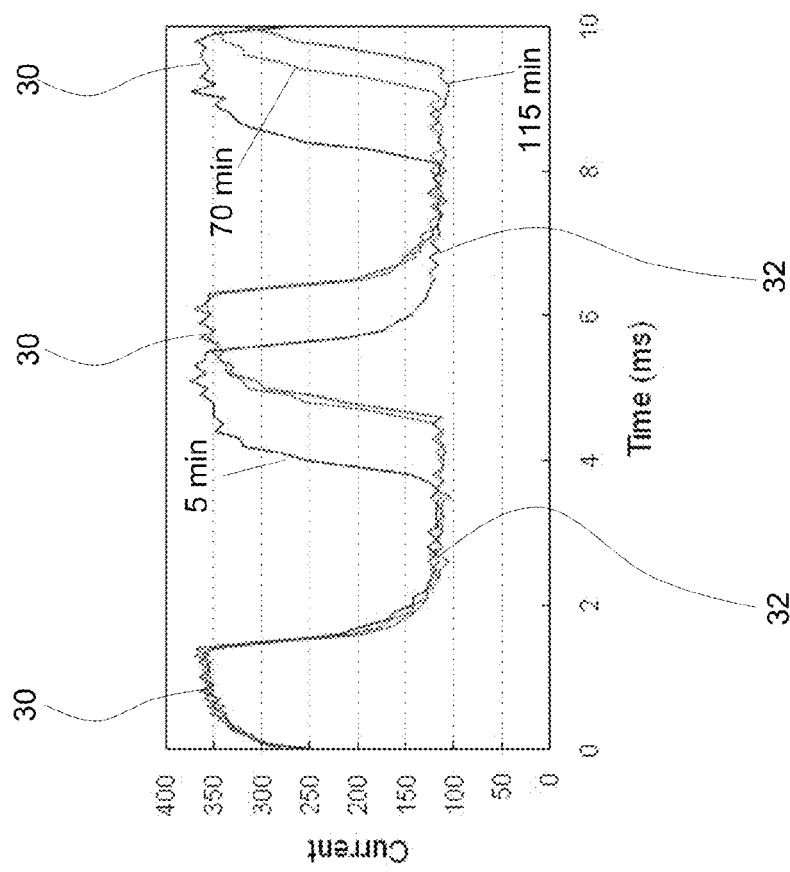
FIG. 3 is a graph comparing pulse waveforms drawn from a new contact tip and a contact tip that has been used.

FIG. 3 graphically illustrates that the frequency of the pulses decreases as a function of usage (total arc-on time) of a contact tip. Specifically, the length of background 32, or the time between peaks 30, is greater after 70 minutes of arc-on time than after 5 minutes of arc-on time (using the same contact tip), and is greater after 115 minutes of arc-on time than after 70 minutes of arc-on time. Therefore, as the contact tip deteriorates during use, the length (time period) of background increases and the frequency of the pulses decreases.

Figure 4:
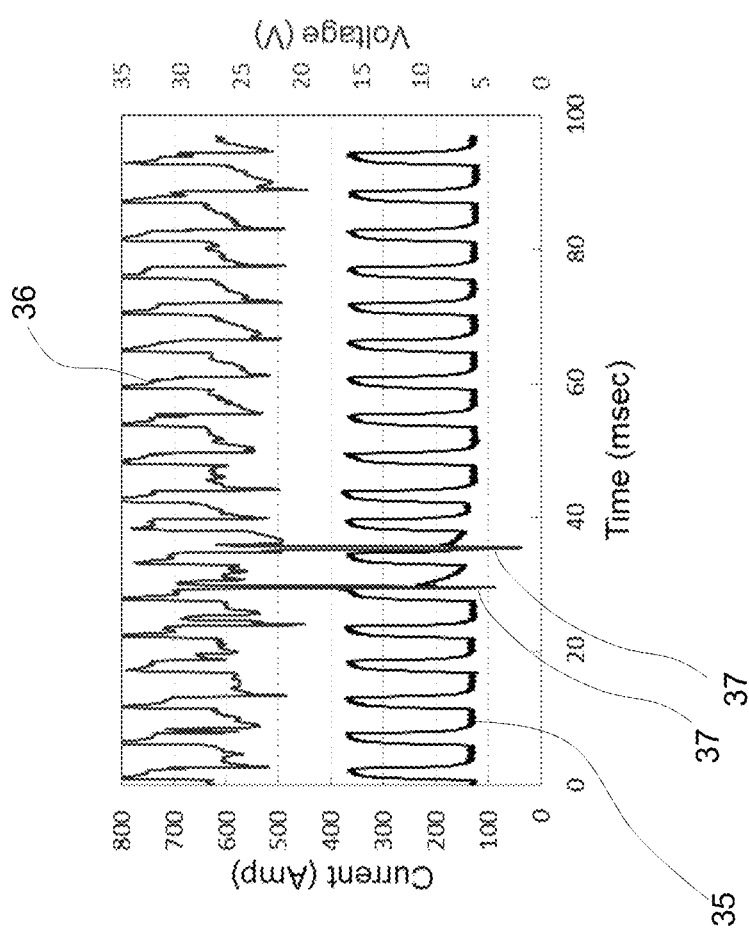
FIG. 4 is a graph showing the occurrence of abnormal low voltage in welding data.

FIG. 4 shows the waveform in the case of occurrence of abnormal low voltage. The waveform includes current 35 and voltage 36. The time scale (x-axis of the graph) is in units of milliseconds. In this application, the background of the voltage 36 is set at a value around 22-27 V. However, if somehow the front end of the electrode wire is not fully molten and detached at the end of one pulse, the electrode will touch the welding pool, and short the entire welding loop (circuit). This causes a sudden drop of the voltage to below 10 V (abnormal low voltage 37), or below 50% of the set value. Deterioration of the contact tip increases the chance of the occurrence of this arc defect.

Figure 5:
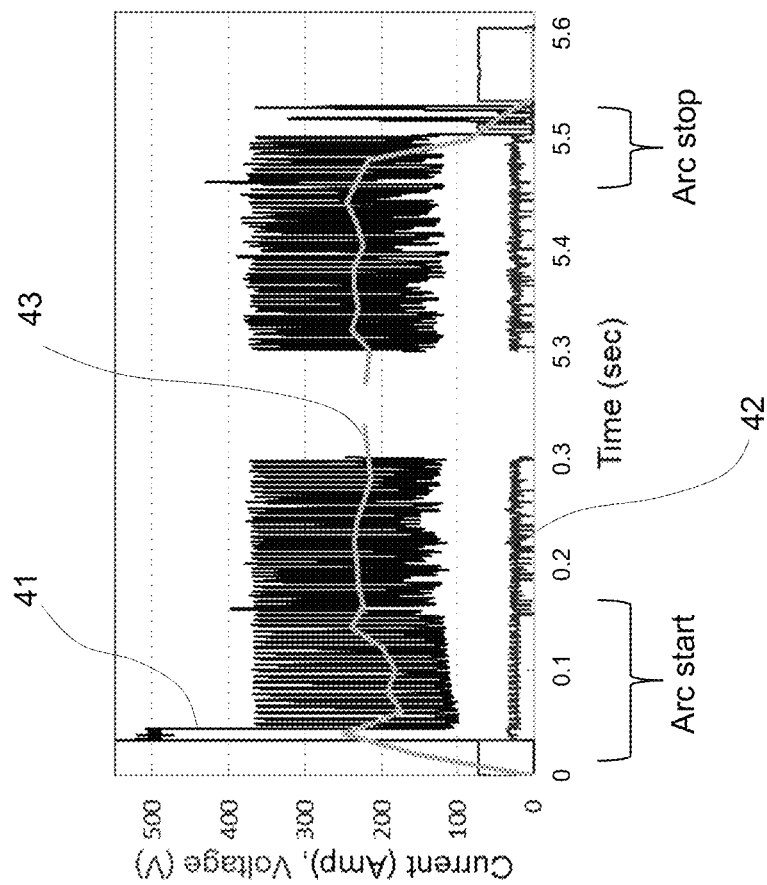
FIG. 5 is a graph of welding current and voltage for a representative weld, including an arc start time and an arc stop time.

FIG. 5 shows the welding data measured during formation of a representative weld, including the current 41, the voltage 42, and the average current 43. The time scale (x-axis of the graph) is in units of seconds, and the "length" of the weld (duration of arc-on time necessary to form the weld) is approximately 5.5 seconds. The welding data includes a plurality of pulses (each pulse having a duration of approximately 2 to 3 milliseconds, as shown, for example in FIG. 3). The graph indicates that the welding data at the beginning ("arc start") and end ("arc stop") is unstable and has special waveforms. These known variations are not representative of the performance of the contact tip. Therefore, the welding data obtained during arc start (for example, 0.25 seconds from start) and arc stop (for example, 0.2 seconds before stop) may be removed during data processing.

In order for the welding torch 13 to perform a weld on the part 24, a pulse waveform is applied through the welding torch to the electrode wire. While the welding torch 13 is operated, the instantaneous welding current and voltage are measured to obtain welding data such as shown in FIG. 5. The data acquisition frequency should be high enough to distinguish the details of the waveform data (wherein each pulse has a duration on the order of milliseconds), for example in the range of approximately 20,000 queries per second (Hz). Also, the welding data may be acquired on a series of repeated representative welds on parts in a production environment. This is due to the fact that the type and location of the weld on the part can influence the welding current/voltage. Therefore, variations in the welding current/voltage which are not caused by contact tip wear may be observed as various welds are performed on a part. Measuring the welding current/voltage only for a representative weld from part to part eliminates this noise from the measured data. Preferably, the representative weld is a weld that takes greater than three seconds of arc-on time to complete (i.e., the weld has a "length" greater than three seconds).

After removing the welding data that corresponds to arc start and arc stop, the pulse frequency, length of the background, and the occurrence of the abnormal low voltage are measured and averaged on each representative weld. For example, a welding cell may make a part that requires five welds (five joints), and the third weld may be chosen as the representative weld. After a new contact tip is installed, the average pulse frequency and the occurrence of abnormal low voltage for the first part that is made are calculated from the welding data. In this case, the average pulse frequency for the first part is 210 Hz and the occurrence of abnormal low voltage is 0. For the second part, the data are calculated as 208 Hz and 2 counts of abnormal low voltage, and the calculations are repeated for each subsequent part. For the 400th part, the calculated values are 185 Hz and 50 counts, respectively, which coincides with the threshold values of contact tip deterioration corresponding to a need for a contact tip change.

The assessment of these parameters may be converted into an index (for examples, a scale of 1 to 0, with 1 indicating a new contact tip and values less than 1 indicating a degree of contact tip wear) which can be outputted by the MLDC 20 as contact tip life data.

The value of the contact tip life data can be monitored in order to determine when a contact tip is nearing or has surpassed its useful life. Thus, a contact tip change can be scheduled in advance, prior to contact tip failure or to the contact tip forming unacceptable welds. If the value of the contact tip life data exceeds the predetermined threshold value, a warning signal may be sounded or displayed, welding with the expired contact tip may be halted, and/or a contact tip change can be required before welding is resumed. The system may order the robot controller to move the welding torch 13 to approach maintenance equipment for an automatic contact tip change procedure.

The MLDC 20 may also display a history of the contact tip life data, which can aid a human operator in judging whether a sudden segregated low value for contact tip life data may be caused by factors such as misalignment of the fixture or out-of-spec dimensions of a workpiece rather than excessive contact tip deterioration.

By calculating and monitoring the value of the contact tip life data, the method according to the present invention avoids unexpected shutdown of a manufacturing line due to sudden failure of a contact tip and/or unacceptable welds on workpieces.

While the present invention has been described in relation to a robotic welding application, it should be understood that the present invention may also be applied to manual welding applications in which pulse waveforms are applied to the welding torch.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method of monitoring contact tip useful life in a welding torch during GMAW-pulse applications, said method comprising the steps of:
    applying a pulse welding waveform through the contact tip to operate a weld, the pulse waveform including current and voltage that periodically change between peaks and background;
    measuring welding current and voltage at a data acquisition frequency that allows for distinguishing the pulse waveform data;
    removing the welding data that corresponds to an arc start and an arc stop;
    assessing deterioration of the contact tip based on one or more of (i) a decrease in the frequency of the peaks, and (ii) an increase in the length of a time period of the background between two peaks.

2. The method of claim 1, wherein the welding data is collected and processed on a series of repeated representative welds sequentially formed on a series of parts.

3. The method of claim 2, wherein the duration of applying the pulse welding waveform to form one said representative weld is greater than 3 seconds.

4. The method of claim 2, wherein the welding data is averaged for each representative weld.

5. The method of claim 1, wherein the contact tip life data is continuously fed to one of an operator and a controller.

6. The method of claim 1, including the step of:
    when the contact tip life data reaches a threshold value, performing one or more of: sounding an alarm, displaying a warning message, scheduling a contact tip change, and triggering an automatic contact tip change.

7. The method of claim 1, wherein the step of assessing deterioration of the contact tip further includes assessing deterioration of the contact tip based on (iii) an increase in the occurrence of abnormal low voltage which is below 50% of a set value of the background.

* * * * *